(12) United States Patent
Tokui et al.

(10) Patent No.: US 10,296,783 B2
(45) Date of Patent: May 21, 2019

(54) IMAGE PROCESSING DEVICE AND IMAGE DISPLAY DEVICE

(71) Applicant: Sharp Kabushiki Kaisha, Sakai, Osaka (JP)

(72) Inventors: Nao Tokui, Sakai (JP); Ikuko Tsubaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 55 days.

(21) Appl. No.: 15/316,254

(22) PCT Filed: May 20, 2015

(86) PCT No.: PCT/JP2015/064466
§ 371 (c)(1),
(2) Date: Dec. 5, 2016

(87) PCT Pub. No.: WO2015/186519
PCT Pub. Date: Dec. 10, 2015

(65) Prior Publication Data
US 2017/0147866 A1    May 25, 2017

(30) Foreign Application Priority Data

Jun. 6, 2014    (JP) ................................ 2014-118024

(51) Int. Cl.
*G06K 9/00* (2006.01)
*G06T 7/70* (2017.01)
(Continued)

(52) U.S. Cl.
CPC ............ *G06K 9/00248* (2013.01); *G06T 7/70* (2017.01); *G06T 7/73* (2017.01); *G06T 11/00* (2013.01);
(Continued)

(58) Field of Classification Search
None
See application file for complete search history.

(56) References Cited

U.S. PATENT DOCUMENTS

2009/0034805 A1* 2/2009 Perlmutter ........ G06F 17/30256
382/118
2009/0147141 A1* 6/2009 Lee .................... G06K 9/00221
348/576
(Continued)

FOREIGN PATENT DOCUMENTS

JP    2013-097588 A    5/2013
JP    2014-049866 A    3/2014

OTHER PUBLICATIONS

Official Communication issued in Chinese Patent Application No. 201580029934.0, dated Dec. 24, 2018.
(Continued)

*Primary Examiner* — Sumati Lefkowitz
*Assistant Examiner* — David Perlman
(74) *Attorney, Agent, or Firm* — Keating & Bennett, LLP

(57) ABSTRACT

There is provided an image processing device that includes a facial organ information detection unit that detects facial organ information which is a position of a facial organ of an object from an input image, a face direction information calculation unit that calculates face direction information of the object from the facial organ information, and an arbitrary face direction image generation unit that generates an image obtained by changing the face direction of the object from the facial organ information and the face direction information, and when it is determined by the face direction information that the face is inclined, the arbitrary face direction image generation unit generates an arbitrary face direction image after conducting a correction on the face direction
(Continued)

information based on front facial organ information which is a facial organ arrangement in the front face of the object.

7 Claims, 11 Drawing Sheets

(51) Int. Cl.
 *G06T 7/73* (2017.01)
 *G06T 11/00* (2006.01)
(52) U.S. Cl.
 CPC .............. *G06T 2207/10016* (2013.01); *G06T 2207/30201* (2013.01)

(56) References Cited

U.S. PATENT DOCUMENTS

| | | | | |
|---|---|---|---|---|
| 2009/0169101 | A1* | 7/2009 | Mitarai | G06K 9/0061 382/167 |
| 2013/0201345 | A1* | 8/2013 | Ling | H04N 5/23219 348/169 |
| 2015/0206354 | A1 | 7/2015 | Shibuhisa et al. | |

OTHER PUBLICATIONS

Jiada, C. et al.; "A Novel Method for Facial Pose Discrimination and Frontal View Synthesis"; Journal of Computer Research and Development; 43(8); 2006 pp. 1487-1484.

* cited by examiner (a)

(b)

(c)

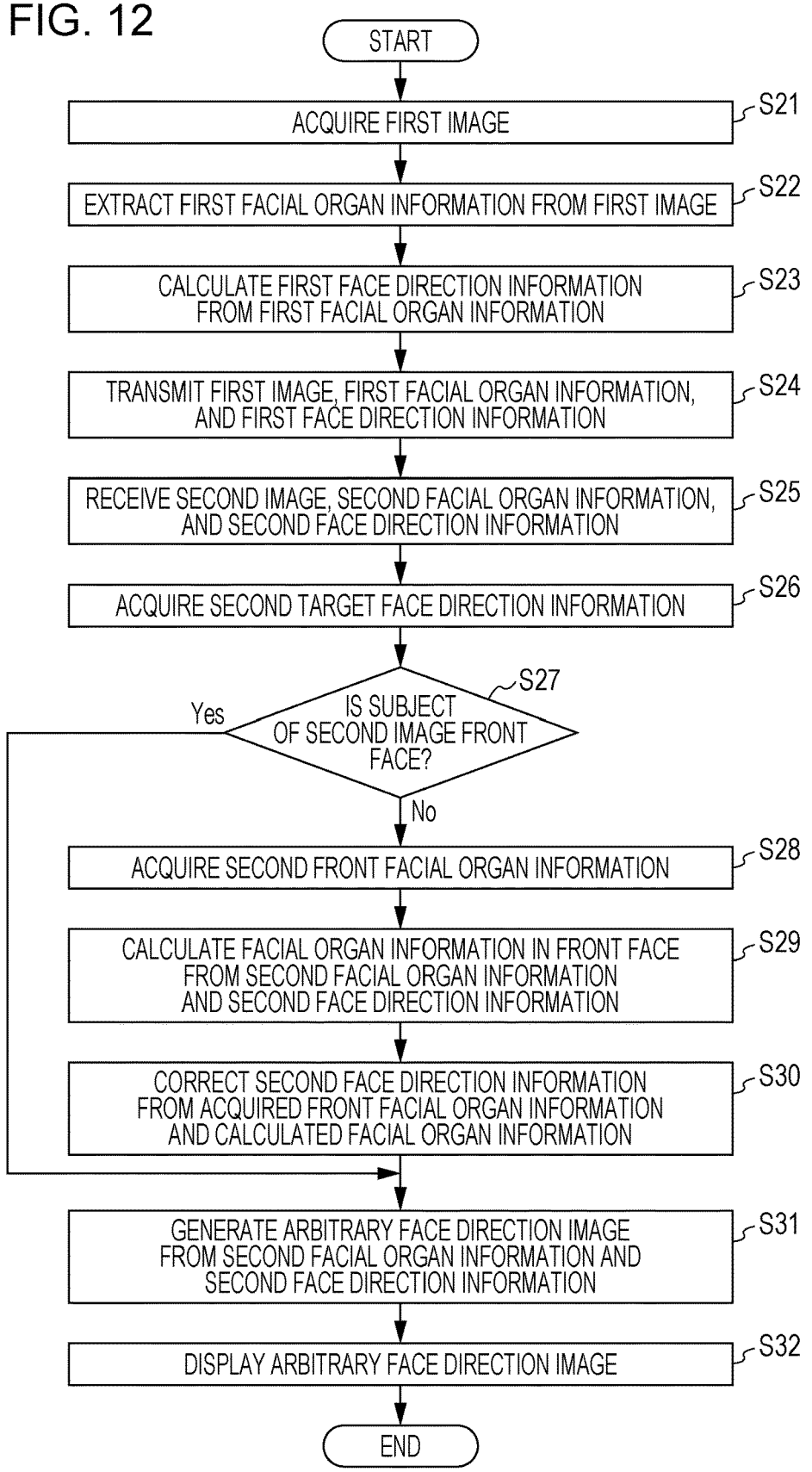

IMAGE PROCESSING DEVICE AND IMAGE DISPLAY DEVICE

TECHNICAL FIELD

The present invention relates to an image processing device that generates a suitable image in a case where an imaging direction of an imaging unit and a display direction of a display unit are aligned, and an image display device that includes the image processing device.

BACKGROUND ART

There is a method that arranges an imaging direction of an imaging unit and a display direction of a display unit to be directed to the same direction and captures an image of a user's face as an object in various kinds of displays such as a mobile phone, a tablet, a notebook PC, a television, or the like.

The following two applications are representative applications of the method. One application is a mirror function that inverts a captured image in a horizontal direction to be displayed in a mirror image to allow a work, such as makeup, for which check of his/her face is required. The other application is a video chat function or a TV conference function that displays the captured image on a display held by a counterpart located at a remote site to allow conversation with the counterpart located at a remote site.

Since a user's face is displayed on the display unit in the mirror function and a counterpart's face is displayed on the display unit in the video chat, the user's face is directed to the display unit rather than the imaging unit. A face direction of the imaged subject and an imaging direction of the imaging unit are not coincident with each other and thus, the imaged subject is not directed to the front side, and in a case where the imaging unit is arranged on an upper side with respect to a display, the downward face is displayed on a display unit, in a case where the imaging unit is arranged on a lower side with respect to the display, the upward face is displayed on the display unit, and in a case where the imaging unit is installed in any of the left side and right side with respect to the display, a profile is displayed on the display unit. As a method for changing the face direction of the object, for example, PTL 1 discloses a method in which a three-dimensional portrait of a person which becomes an object is accurately prepared based on a two-dimensional face photograph of the person.

CITATION LIST

Patent Literature

PTL 1: Japanese Unexamined Patent Application Publication No. 2013-97588

SUMMARY OF INVENTION

Technical Problem

However, in the method disclosed in PTL 1, a three dimensional model of a head part is generated after a direction of a two-dimensional face photograph is adjusted and it was difficult to generate a preferable image when a direction of the two-dimensional face photograph and the adjusted direction differ. For example, when a length between the eyes and nose of an object is reduced in a generated image in a case where the adjusted direction is less than the direction of the two-dimensional face photograph or when a distance length between the eyes and nose of the object is extended in a generated image in a case where the adjusted direction is greater than the direction of the two-dimensional face photograph, it was difficult to generate an arbitrary face direction image close to the actual face.

The present invention has been made in an effort to solve the problems described above and intends to provide an image processing device that generates a suitable image in a case where an imaging direction of an imaging unit and a display direction of a display unit are aligned.

Solution to Problem

According to an aspect of the present invention, there is provided an image processing device that includes a facial organ information detection unit that detects facial organ information which is a position of a facial organ of an object from an input image, a face direction information calculation unit that calculates face direction information of the object from the facial organ information, and an arbitrary face direction image generation unit that generates an image obtained by changing the face direction of the object from the front facial organ information and the face direction information, and in a case it is determined by the face direction information that the face is inclined, the arbitrary face direction image generation unit generates an arbitrary face direction image after conducting a correction on the face direction information based on front facial organ information which is a facial organ arrangement in the front face of the object.

In the present invention, when face direction information is incorrect, an arbitrary face direction image is generated while correcting a deviation of the face direction information using the position of the facial organ such as the eyes and nose in the front face of the object which is set in advance and the position of the facial organs in the front face calculated from the face direction information.

This application claims the benefit of described in Japanese Priority Patent Application 2014-118024, the contents of the specification and/or drawings of which are incorporated herein by reference.

Advantageous Effects of Invention

According to the present invention, in a case where an imaging direction of an imaging unit and a display direction of a display unit are aligned, it is possible to generate an arbitrary face direction image by taking into account a face direction of an object and an arrangement of facial organs in a front face becomes possible to generate a suitable image.

BRIEF DESCRIPTION OF DRAWINGS

FIG. 12 is a flow chart illustrating a flow of image processing in the third embodiment of the present invention.

DESCRIPTION OF EMBODIMENTS

Hereinafter, embodiments of the present invention will be described with reference to the accompanying drawings. In the meantime, the accompanying drawings illustrate specific embodiments and mounting examples in conformity with a principle of the present invention, however, these embodiments and examples are for understanding of the present invention and are not necessarily intended to interpret the present invention as being limited thereto. In addition, a configuration in each figure is exaggeratedly described so as to make it easier to understand the present invention, and an interval between components and a size thereof illustrated in each figure are different from those actually are.

In the following, description will be made on, for example, an example of image processing for arranging an imaging direction of an imaging unit and a display direction of a display unit to be directed to the same direction and capturing an image of a user's face as an object in various kinds of image display device such as a mobile phone, a tablet, a notebook PC, a television, or the like.

First Embodiment

Figure 1A:
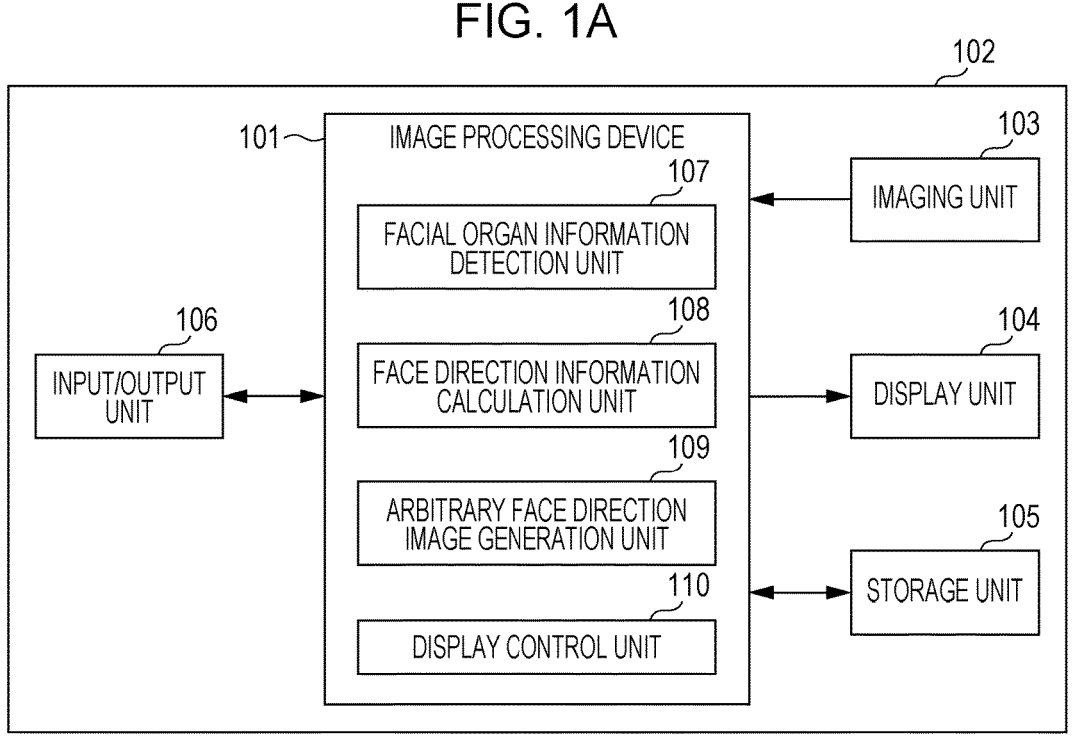
FIG. 1A is a functional block diagram illustrating an example of a configuration of an image display device equipped with an imaging unit and including an image processing device according to a first embodiment of the present invention.

FIG. 1A is a functional block diagram illustrating an example of a configuration of an image processing device 101 and an image display device 102 equipped with an imaging unit and including the image processing device 101 according to a first embodiment of the present invention and is a diagram illustrating an example of an apparatus that captures an image of the object by the imaging unit 103, generates a preferable image from the captured image, and displays the generated image on a display unit 104.

In the following, details of an example of a configuration and an example of operations of a system of the first embodiment of the present invention will be described with reference to FIG. 1A in detail.

As illustrated in FIG. 1A, the image display device 102 according to the present embodiment includes an imaging unit 103, a display unit 104, a storage unit 105, an image processing device 101, and an input/output unit 106.

The imaging unit 103 includes an imaging lens and an image sensor such as a Charge Coupled Device (CCD) or a Complementary Metal Oxide Semiconductor (CMOS), and is able to capture a still image or a moving image of an object.

The display unit 104 is a display screen such as a Liquid Crystal Display (LCD) or organic Electro Luminescence (EL) display, and displays such as an image, information such as characters, an object's image, or the like.

The image processing device 101 can be constituted with, for example, a Central Processing Unit (CPU), a Graphic Processing Unit (GPU), and the like, and acquires an image from the imaging unit 103, the storage unit 105, the input/output unit 106, or the like, and processes the image to output the processed image to the display unit 104, the storage unit 105, or the like.

The image processing device 101 includes, for example, a facial organ information detection unit 107, a face direction information calculation unit 108, an arbitrary face direction image generation unit 109, and a display control unit 110.

The facial organ information detection unit 107 detects facial organ information, that is, a facial organ position of an object from an image input to the image processing device 101.

The face direction information calculation unit 108 calculates face direction information of the object based on the facial organ information detected by the facial organ information detection unit 107.

When it is determined that the face direction of the object is not a predetermined direction, for example, a front direction based on the face direction information calculated by the face direction information calculation unit 108, the arbitrary face direction image generation unit 109 generates an image obtained by changing the face direction of the object to an arbitrary face direction using the front facial organ information detected by the facial organ information detection unit 107, the face direction information calculated by the face direction information calculation unit 108, and front facial organ information indicating an arrangement of facial organs of the object in the front face. The front facial organ information is information generated in advance and details thereof will be described later.

The display control unit 110 performs control displaying of an image generated by the arbitrary face direction image generation unit 109 on the display unit 104.

The storage unit 105 is, for example, a flash memory or a hard disk, stores the image, front facial organ information, or the like, and saves device unique data.

The input/output unit 106 inputs instruction, voice of a user, a designated target face direction, or the like to the image processing device 101 using a keyboard, a mouse, or a voice input/output device such as a speaker, or outputs voice.

As such, the example of the configuration of the system of the first embodiment has been described.

Figure 2:
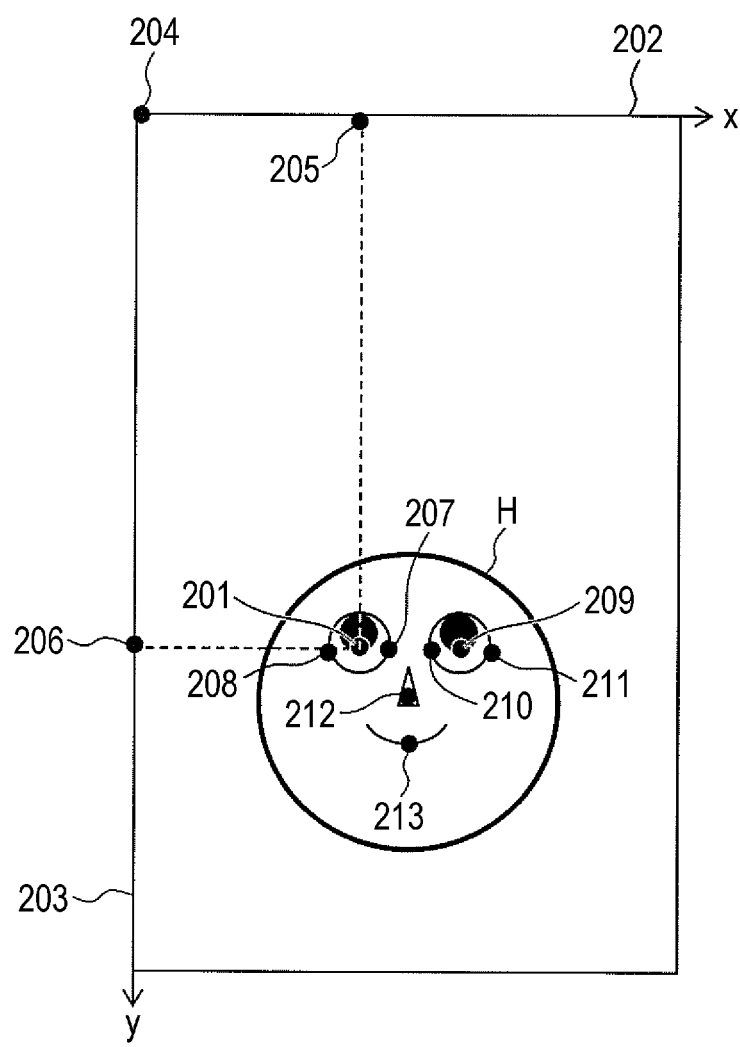
FIG. 2 is a diagram for explaining facial organ information detected by a facial organ information detection unit.

Next, description will be made on operations of the image display device 102 in the first embodiment in detail using FIG. 2 to FIG. 9. First, description will be made on operations of facial organ information detection in detail using FIG. 2. FIG. 2 is a diagram for explaining facial organ information detected by the facial organ information detection unit 107.

Figure 3:
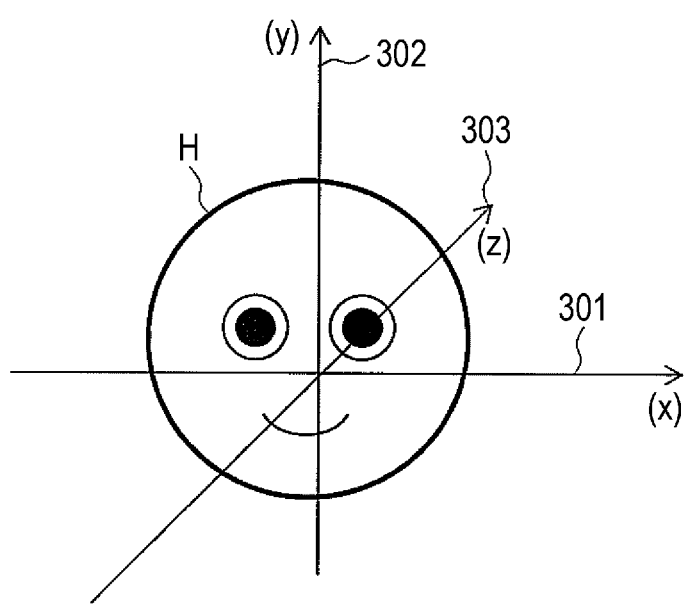
FIG. 3 is a diagram for explaining an axis indicating a face direction of an object.
Figure 4:
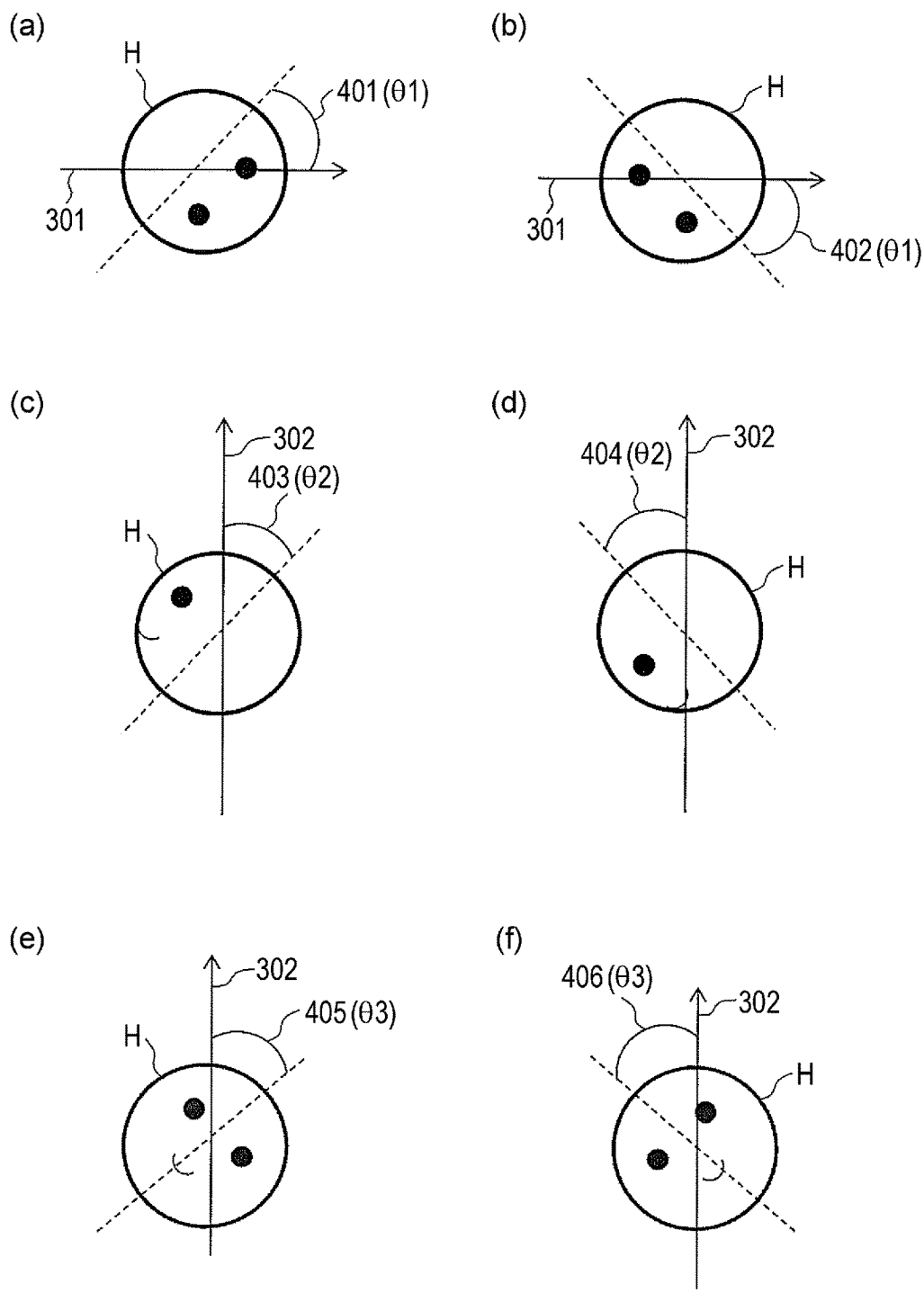
FIG. 4 is a diagram for explaining a face direction of an object with respect to an axis.
Figure 5:
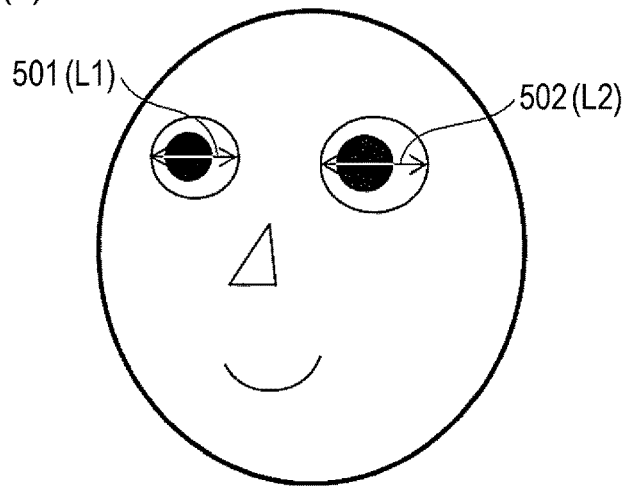
FIG. 5 is a diagram for explaining a calculation method of an inclination of the face with respect to the x-axis, the y-axis, and the z-axis.
Figure 5:
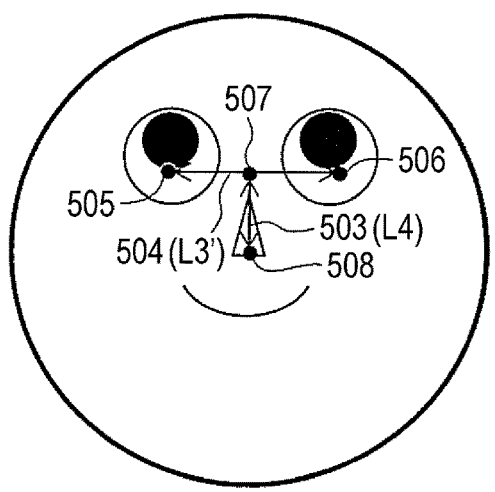
Figure 5:
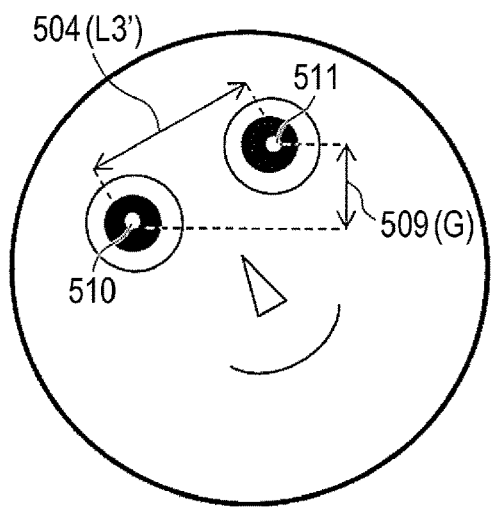
Figure 6:
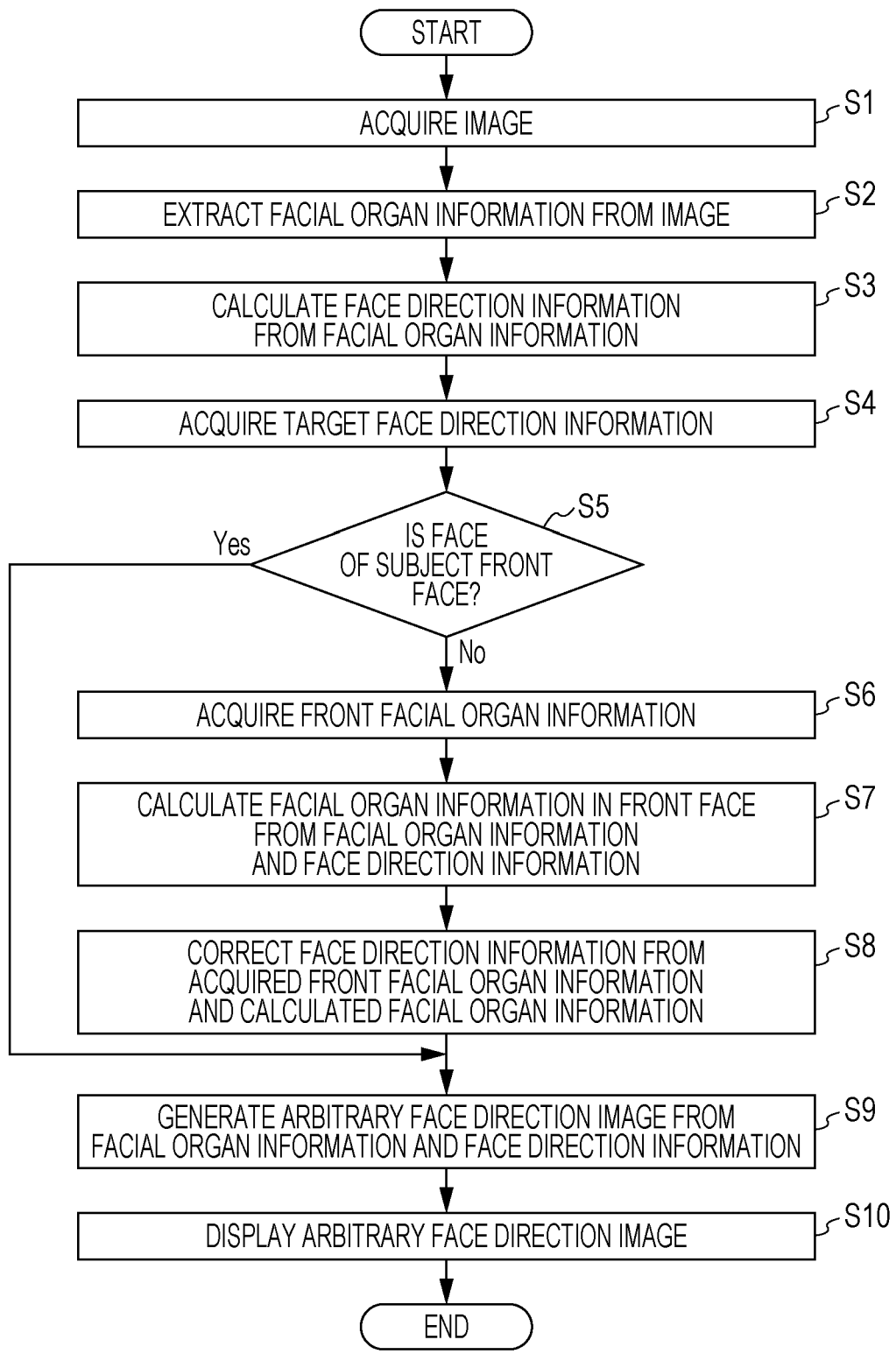
FIG. 6 is a flow chart illustrating a flow of image processing in the first embodiment of the present invention.

FIG. 3 is a diagram for explaining an axis indicating a face direction of an object, FIG. 4 is a diagram for explaining a face direction of an object with respect to each axis of a three-dimensional coordinate, and FIG. 5 is a diagram for explaining a calculation method of an inclination of the face with respect to the x-axis, the y-axis, the z-axis. FIG. 6 is a flow chart illustrating a flow of image processing in the present embodiment.

First, processing is started (START), the image processing device 101 acquires an image captured by the imaging unit 103 in Step S1, and the facial organ information detection unit 107 extracts facial organ information of the object from the image in Step S2. Here, the facial organ information is a position of a constitutional element such as the nose, the mouth, or the like of the object. In FIG. 2, a position of the center of left eye of an object H which is a piece of facial organ information is indicated by a coordinate 201. Here, the left eye of the object H is assumed as the eye projected in the left of the image, that is, the right eye in the object H. The coordinate 201 indicating a position of the center of left eye is a position which becomes (x, y)=(x-axis component 205, y-axis component 206) when the horizontal direction of the image is assumed as the x-axis 202, the vertical direction of the image is assumed as the y-axis 203, and the upper-left coordinate of the image is assumed as the origin 204 (x, y)=(0, 0). Similarly, a position of the inner eye corner of the left eye, a position of the outer eye corner of the left eye, a position of the center of the right eye, a position of the inner eye corner of the right eye, a position of the outer eye corner of the right eye, a position of the center of the nose, and a position of the center of the mouth of the object H are respectively indicated by a coordinate 207, a coordinate 208, a coordinate 209, a coordinate 210, a coordinate 211, a coordinate 212, and a coordinate 213. Here, although the facial organ information is described using 6 points for the eyes, 1 point for the nose, and 1 point for the mouth 1, furthermore, when a plurality of points are allocated to an element such as the left end of nose, the right end of nose, the left end of mouth, or the right end of mouth of the eyes, nose, mouth or the like constituting the face, it is possible to finely set the degree of deformation of the facial organ and generate the image having no sense of incongruity and thus, it is preferable.

As a method of detecting the facial organ information from an image, there have been known, for example, a method by pattern matching using a template or a method that statistically obtains an identification function from learned samples of multiple facial organ images and images (of non-facial organ) other than facial organs to detect the facial organ information (see P. Viola and M. Jones, "Rapid object detection using a boosting cascade of simple features", Proc. IEEE Conf. CVPR, pp. 511-518, 2001), and the method of detecting face position information can be implemented using the above-described methods. In this manner, detection of the facial organ information is performed.

Next, in Step S3, the face direction information calculation unit 108 calculates face direction information of the object using the facial organ information. Description will be made on operations of the face direction information calculation unit 108 with reference to FIG. 3 to FIG. 5.

In the face direction information calculation unit 108, the face direction of the object is calculated using the front facial organ information. The face direction of the object is represented by an inclination with respect to the x-axis 301, the y-axis 302, and the z-axis 303 illustrated in FIG. 3. The x-axis 301 is a horizontal axis passing from the left end to the right end in the face of the object, the y-axis 302 is an axis of the vertical direction passing from the lower end to the upper end in the face of the object, and the z-axis 303 is an axis passing from the front side to the back side in the face of the object.

Next, a relationship between a face direction and an inclination of the face with respect to each axis will be described using FIG. 4. As illustrated in FIGS. 4(a) and 4(b), when the object H is seen from above, it is represented that in a case where an inclination of the face 401 (θ1) with respect to the x-axis is a positive value, (a) and a direction of face is the right direction, that is, the left direction in the object, and in a case where an inclination of the face 402 (θ1) is a negative value, (b) and the direction of face is the left direction, that is, the right direction in the object.

As illustrated in FIGS. 4(c) and 4(d), when the object H is seen from side, it is represented that in a case where an inclination of the face 403 (θ2) with respect to the y-axis is a positive value, (c) and a direction of face is the upper direction, and in a case where an inclination of the face 404 (θ2) is a negative value, (d) and a direction of face is the lower direction.

As illustrated in FIGS. 4(e) and 4(f), when the object H is seen from side, it is represented that in a case where an inclination of the face 405 (θ3) with respect to the z-axis is a positive value, the inclination of the face is inclined clockwise, and in a case where an inclination of the face 406 (θ3) is a negative value, the inclination of the face is inclined counterclockwise. It is represented that a case where the inclination of the face with respect to the x-axis and the inclination of the face with respect to the y-axis are 0, the object is directed toward the front side.

Next, a calculation method of an inclination of the face with respect to the x-axis, the y-axis, and the z-axis will be described using FIG. 5. FIG. 4 will be appropriately referenced. The inclination of the face with respect to the x-axis is calculated from, for example, a ratio between lengths of the left eye and right eye. Each of the lengths of the left eye and right eye is assumed as a length between a position of the inner eye corner and a position of the outer eye corner. Though not illustrated, for example, when the coordinate of point A is assumed as (x1,y1) and the coordinate of point B is assumed as (x2,y2), a length L between the point A and the point B can be calculated by Equation (1) as the Euclidean distance between point A and point B.

$$L=\sqrt{(x1-x2)(x1-x2)+(y1-y2)(y1-y2)} \quad (1)$$

The length of the left eye 501(L1) is calculated from a coordinate of the position of the inner eye corner of the left eye and a coordinate of the position of the outer eye corner of the left eye using the Equation (1). Similarly, the length of the right eye 502(L2) is calculated from a coordinate of the position of the inner eye corner of the right eye and a coordinate of the position of the outer eye corner of the right eye using the Equation (1) (FIG. 5(a)). Next, a ratio C1 between lengths of the left eye and right eye is calculated using Equation (2).

$$C1 = \frac{L2}{L1} \quad (2)$$

Here, it is assumed that the length of the left eye is L1 and the length of the right eye is L2. An inclination θ1 of the face of the object with respect to the x-axis is calculated from the ratio C1 between lengths of the left eye and right eye using Equation (3).

$$\theta1=90(1-C1) \quad (3)$$

With processing described above, the inclination θ1 of the face of the object with respect to the x-axis is calculated.

As illustrated in FIG. 5(b), an inclination θ1 of the face with respect to the y-axis is calculated from a ratio between a length between the eyes and the nose 503 and an interpupillary distance 504 of the object and the inclination of the face with respect to the x-axis. The interpupillary distance 504 of the object is calculated from a length between the position coordinate 505 of the center of left eye and the position coordinate 506 of the center of the right eye of the object using Equation (1). In this case, when the inclination θ1 of the face of the object with respect to the x-axis becomes larger, the interpupillary distance is calculated to be shorter and thus, the interpupillary distance is corrected using Equation (4) in order to calculate the interpupillary distance in the front face of the object.

$$L3' = \frac{L3}{\cos\theta 1} \quad (4)$$

Here, the interpupillary distance before the correction is assumed as L3 and the interpupillary distance after the correction is assumed as L3'. A length between the eyes and nose 503 of the object is calculated from the position coordinate 507 of an intermediate point between the center of left eye and the center of right eye of the object and the position coordinate of nose using Equation 508. A ratio C2 between the length L4 between the eyes and nose of the object and the interpupillary distance L3' after the correction is calculated using Equation (5).

$$C2 = \frac{L3'}{L4} \quad (5)$$

An inclination θ2 of the face of the object with respect to the y-axis is calculated from the ratio C2 between the length L4 between the eyes and nose of the object and the interpupillary distance L3' after the correction using Equation (6).

$$\theta 2 = 90(K1 - C2) \quad (6)$$

Here, K1 is assumed as a ratio between the length between the eyes and nose and the interpupillary distance in the front face. The K1 may use an average value or an intermediate value of ratios between the length between the eyes and nose and the interpupillary distance obtained by calculating the front face of a plurality of persons that are photographed in advance and a ratio obtained by calculating the front face of an object photographed in advance may be set as K1. With processing described above, the inclination θ2 of the face of the object with respect to the y-axis is calculated.

As illustrated in FIG. 5(c), an inclination of the face of the object with respect to the z-axis is calculated from the interpupillary distance 504 and a deviation 509 between the left eye and the right eye in the vertical direction. The deviation 509 between the left eye and the right eye in the vertical direction is represented by an absolute value of a difference between a y-coordinate of a position coordinate 510 of left eye and a y-coordinate of a position coordinate 511 of right eye. An inclination θ3 of the face of the object with respect to the Z-axis is calculated by Equation (7).

$$\theta 3 = \arcsin\left(\frac{G}{L3'}\right) \quad (7)$$

Here, G is assumed as the deviation 509 between the left eye and the right eye in the vertical direction, for example, as an absolute value of a difference between the y-coordinate of the position coordinate 510 of the left eye and the y-coordinate of the position coordinate 511 of the right eye.

With processing described above, the face directions θ1, θ2, and θ3 [degree], which represent the inclination of the face with respect to the x-axis, y-axis, z-axis of the object, are calculated as face direction information and output to the arbitrary face direction image generation unit 109.

Figure 1B:
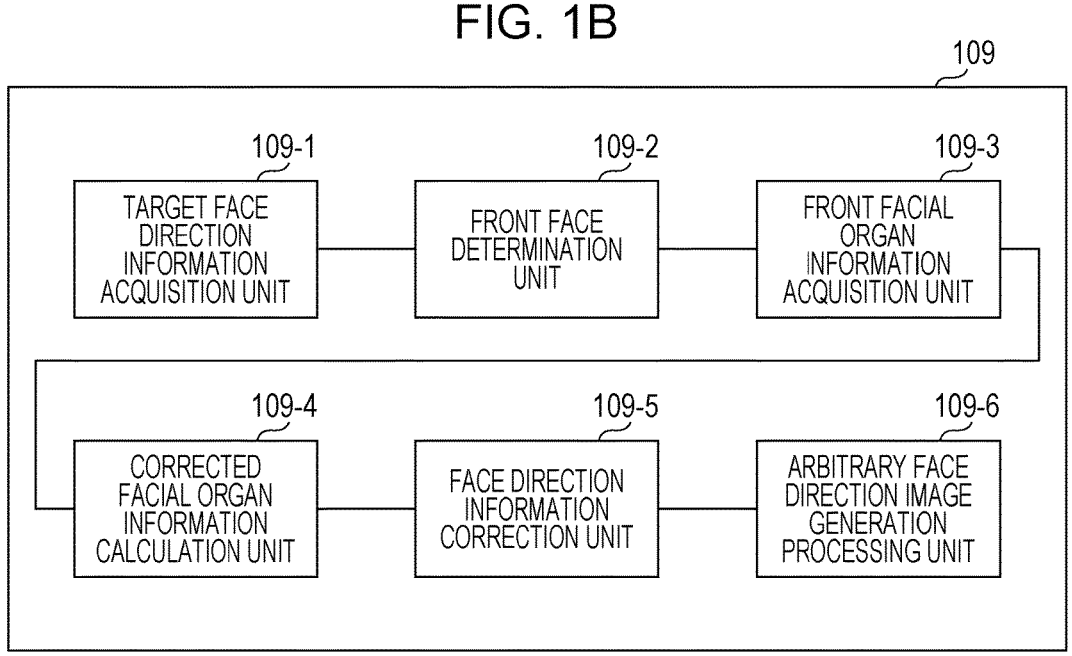
FIG. 1B is a functional block diagram illustrating an example of a configuration of an arbitrary face direction image generation unit according to the present embodiment.
Figure 7:
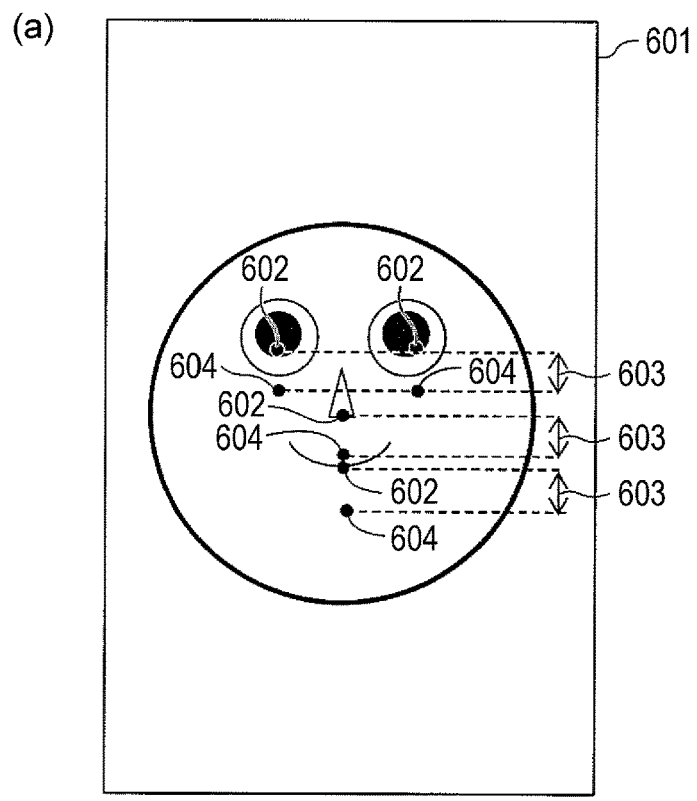
FIG. 7 is a diagram for explaining coordinate conversion using a feature point and a target point.
Figure 7:
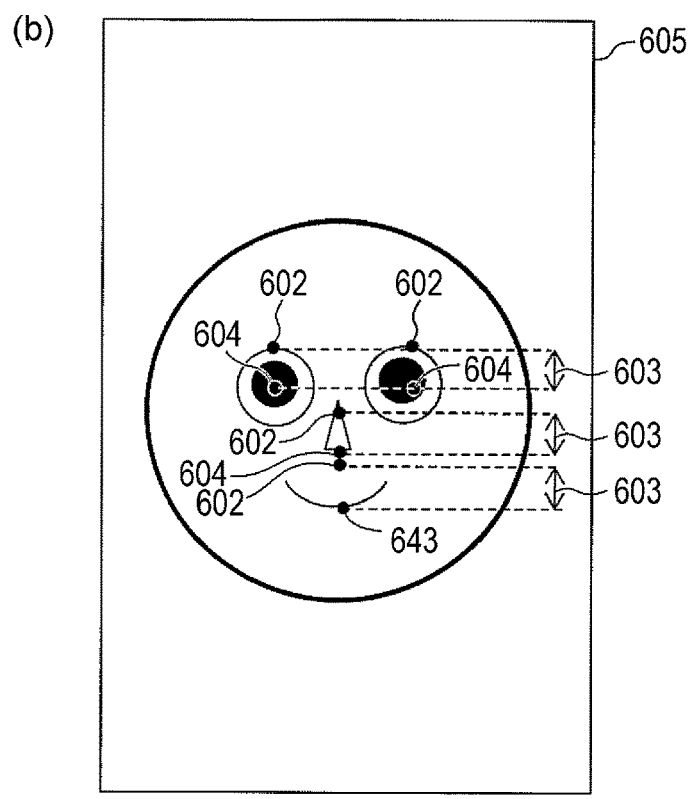
Figure 8:
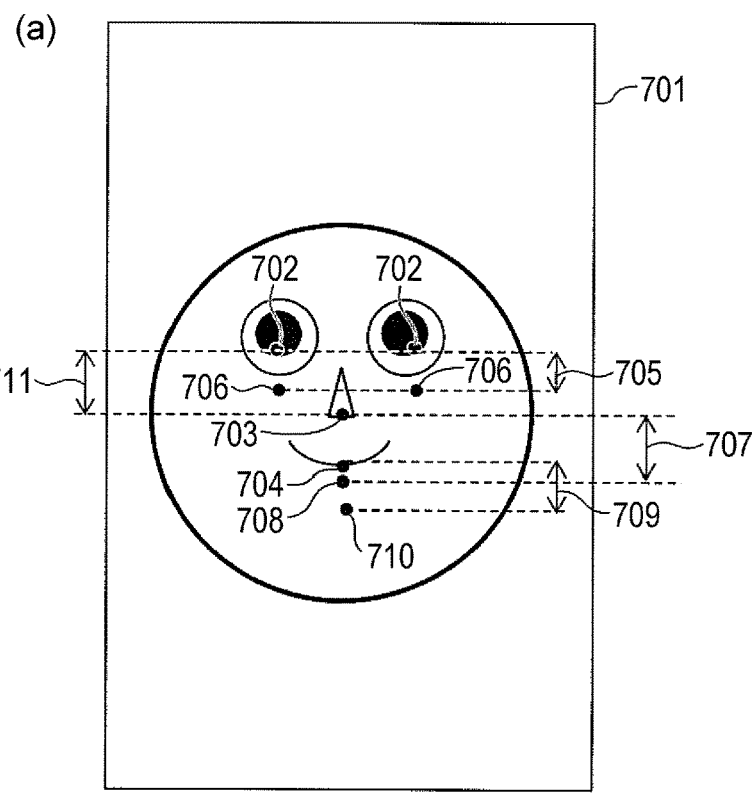
FIG. 8 is a diagram for explaining an example of adjusting positions of the feature point and target point for each facial organ.
Figure 8:
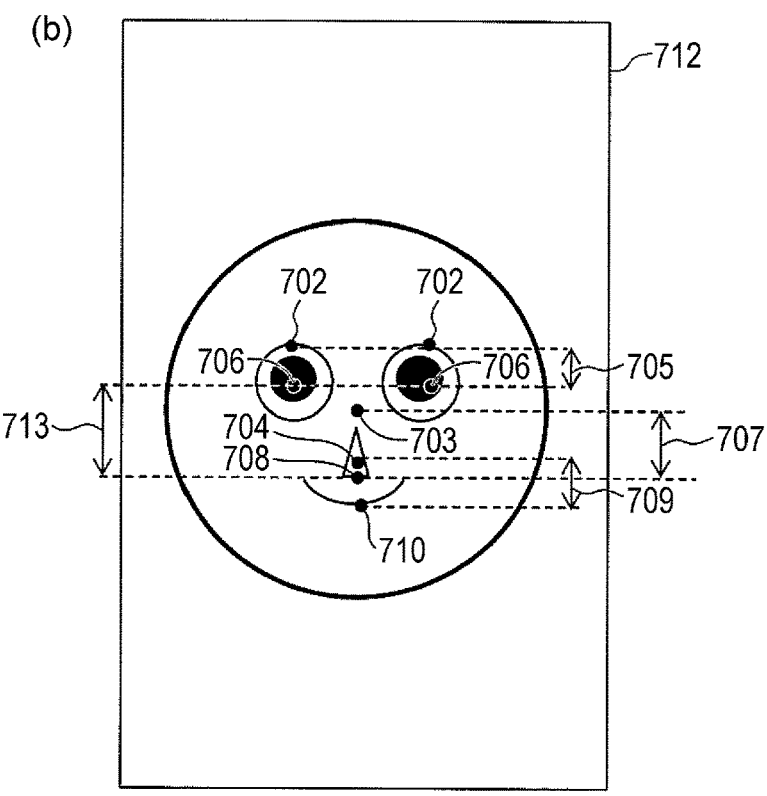
Figure 9:
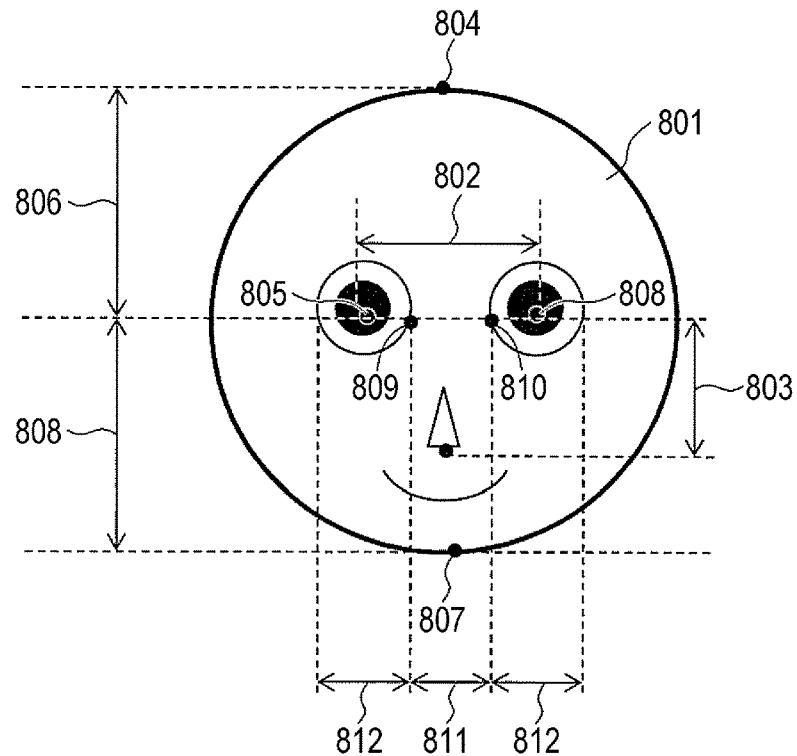
FIG. 9 is a diagram for explaining front facial organ information.
Figure 10:
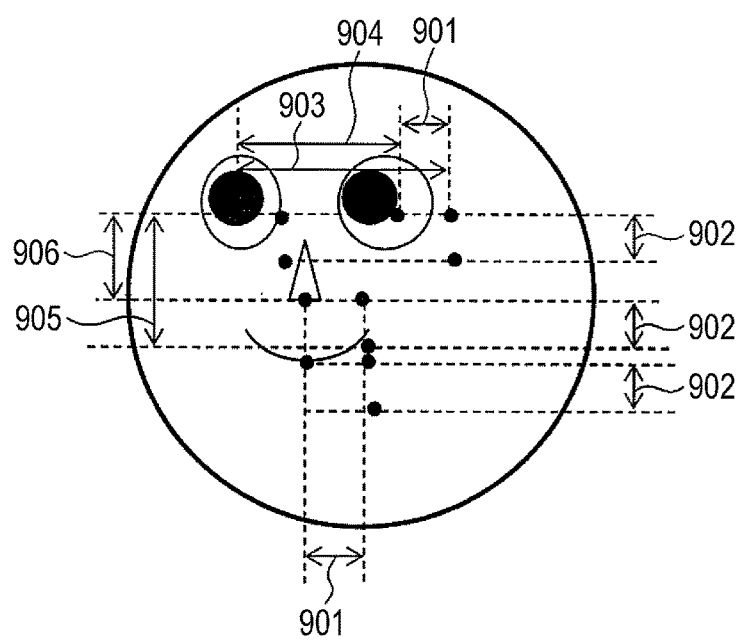
FIG. 10 is a diagram for explaining a method for changing positions of the facial organs.

Finally, description will be made on operations of the arbitrary face direction image generation unit 109 will be described in detail with reference to FIG. 1B, FIG. 6, and FIG. 7 to FIG. 10. FIG. 1B is a functional block diagram illustrating an example of a configuration of the arbitrary face direction image generation unit 109. FIG. 7 is a diagram for explaining a relationship between a feature point and a moving point. FIG. 8 is a diagram for explaining an example of adjusting positions of the feature point and target point for each facial organ. FIG. 9 is a diagram for explaining front facial organ information. FIG. 10 is a diagram for explaining a method for changing positions of the facial organs.

As illustrated in FIG. 1B, the arbitrary face direction image generation unit 109 includes a target face direction information acquisition unit 109-1, a front face determination unit 109-2, a front facial organ information acquisition unit 109-3, a corrected facial organ information calculation unit 109-4, a face direction information correction unit 109-5, and an arbitrary face direction image generation processing unit 109-6. As such, the arbitrary face direction image generation unit 109 changes the position of the facial organ and deforms the facial organ to perform processing for generating the arbitrary face direction image.

First, in Step S4, a target face direction information acquisition unit 109-1 acquires target face direction information designated by a user from the input/output unit 106.

In Step S5, the front face determination unit 109-2 determines whether the face of the object is the front face or not based on the face direction information calculated in Step S3. When the face of the object is the front face, processing in Steps S9 and S10 is executed. When the face of the object is not the front face, processing in Steps S6 to S10 is executed.

When the face direction of the object of the input image is not the front face (No in Step S5), first, in Step S6, the front facial organ information acquisition unit 109-3 acquires front facial organ information from the storage unit 105. Next, in Step S7, the corrected facial organ information calculation unit 109-4 calculates facial organ information in the front face from the facial organ information extracted in Step S2 and the face direction information calculated in Step S3.

In Step S8, the corrected facial organ information calculation unit 109-4 corrects the face direction information from the front facial organ information acquired in Step S6 and the facial organ information in the front face calculated in Step S7. That is, the corrected facial organ information calculation unit 109-4 calculates the position of the facial organ in the front face and compares the calculated position of the facial organ with front facial organ information which is set in advance to conduct correction on the face direction information.

Next, in Step S9, the arbitrary face direction image generation processing unit 109-6 generates the arbitrary face direction image from the facial organ information and the face direction information.

Next, in Step S10, the arbitrary face direction image generation unit 109 can output the generated image to the display unit 104 to display a suitable image on the display unit 104.

As such, the image display device 102 of the first embodiment operates (END). With this, the position of the facial organ is not moved to an unnatural position and a preferable image having less sense of incongruity is generated.

As illustrated in Step S8, there is an affine conversion, a B-spline conversion, or a rigid MLS (S. Schaefer, T. McPhail and J. Warren, "Image Deformation using moving least squares", ACM Trans. Graph, vol. 25, no. 3, pp. 533-540, 2006) as a method for changing a position and deforming a shape of a facial organ in an image. These are methods of setting a feature point which is set in the image and a point of a movement destination of the feature point, that is, a target point and performing a coordinate conversion so as to make the feature point and the target point close to each other. The coordinate conversion using the feature point and the target point will be described using FIGS. 7(a) and 7(b). For example, when the position of the detected facial organ is set as a feature point 602 in an input face image 601, positions deviated from the feature point in the y-axis direction by the number of 603 pixels are set as target points 604 with respect to all the feature points, and the coordinate conversion is conducted, it is possible to generate an image 605 in which the facial organs are moved from the feature points in the y-axis direction by the number of 603 pixels.

Furthermore, an example adjusting the positions of the feature point and the target point for each facial organ will be described using FIGS. 8(a) and 8(b). In the input image 701, differences between the feature point and the target point in the eyes 702, the nose 703, and the mouth 704 of the facial organs is changed. That is, the position deviated from the feature point 702 by the number of 705 pixels is set as a target point 706 with respect to the eyes of the facial organ, that is, the feature point 702. Next, the position deviated from the feature point 703 by the number of 707 pixels is set as a target point 708 with respect to the nose of the facial organ, that is, the feature point 703. The position deviated from the feature point 704 by the number of 709 pixels is set as a target point 710 with respect to the mouth of the facial organ, that is, the feature point 704. When coordinate conversion is conducted based on settings of the feature point and the target point, a length 713 between the eyes and the nose of a generated image 712 becomes longer than the length 711 between the eyes and the nose of the input image 701 and thus, it is possible to generate an image obtained by changing a positional relationship between the facial organs, that is, an arrangement of the facial organs. In this case, when a point at which the positions of the feature point and the target point are the same, that is, a point which is not unchanged in the input image and the output image is set in the end of image or in the periphery of outline of the object, a distortion is suppressed in a region other than the face of the object and thus, which is preferable.

First, a method in which a position of the facial organ in the front face of the object is calculated (Step S7), the calculated position of the facial organ and front facial organ information which is set in advance are compared, and correction is conducted on the face direction information (Step S8) will be described. The front face of the object corresponds to the face direction in which the inclination θ1 with respect to the x-axis among the face direction information and the inclination θ2 with respect to the y-axis among the face direction information become 0. The interpupillary distance L3' and length L4' between the eyes and the nose of the face in the front face are calculated from the interpupillary distance L3 of the face and the length L4 between the eyes and the nose and face direction information θ1 and θ2 of the input image. The interpupillary distance L3' in the front face is calculated by the Equation (4) using the face direction information θ1 indicating an inclination of the face direction with respect to the x-axis. Next, the length L4' between the eyes and the nose after the correction is calculated by Equation (8) using the face direction information θ2 indicating an inclination of the face direction with respect to the y-axis.

$$L4' = \frac{L4}{\cos\theta 2} \tag{8}$$

Next, a method for correcting the face direction information based on the front facial organ information will be described. The face direction information is corrected using an interpupillary distance L3' in the front face, the length L4' between the eyes and the nose in the front face calculated based on the face direction information and an interpupillary distance L3" in the front facial organ information determined in advance, and the length L4" between the eyes and the nose. A correction quantity θ1' for the inclination θ1 with respect to the x-axis is calculated by Equation (9).

$$\theta 1' = \arccos\left(\frac{L3}{L3''}\right) - \arccos\left(\frac{L3}{L3'}\right) \tag{9}$$

A correction quantity θ2' for the inclination θ2 with respect to the y-axis is calculated by Equation (10).

$$\theta 2' = \arccos\left(\frac{L4}{L4''}\right) - \arccos\left(\frac{L4}{L4'}\right) \tag{10}$$

Next, description will be made on front facial organ information using FIG. 9. The front facial organ information is generated from an image of the front face which is input in advance. In this case, the image of the input front face may be either a still image or a moving image. In a case where an input is a moving image of a plurality of frames, the image may be a moving image photographed in real time from the imaging unit. In this case, the possibility that all frames of the photographed moving images are the front face is low and in such a case, the front facial organ information is generated using the position of the facial organ of the object determined as the front face in past frames. When there is a plurality of facial organs of the object determined as the front face in past frames, an average value or an intermediate value of the positions of the facial organs is used. In a case where all of the input images described above are the still image or are not determined as the front face in the past frames, a position of the front facial organ is calculated using a golden ratio (standard value) of a face of human being. The golden ratio corresponds to an arrangement of facial organs of an average human being 801. The position of the facial organ in the generated image is set not to be deviated from the facial organ arrangement of the average human being, for example, a ratio between the interpupillary distance 802 and the length 803 between the eyes and the nose is set to be 32:25, a ratio between the length 806 between the upper end of the head 804 and the eyes 805 and the length 808 between the eyes 805 and the lower jaw 807 is set to be 1:1, or a ratio between the length 811 between the inner corner 809 of the left eye and the inner corner 810 of the right eye and the lengths 812 of the eyes is set to be 1:1.

With processing described above, when the front facial organ information is calculated, in a case where the image of the input front face is a moving image, it is possible to use the arrangement of the facial organs in the front face of the object and accurately generate the front face of the object, and thus, it is preferable. In a case where the image of the input front face is not determined as the front face in past frames even in a still image or a moving image, it is possible to set a face arrangement in the front face of the object using the golden ratio so as to make the position of the facial organ in the generated image close to a facial organ arrangement of an average human being and thus, it is preferable.

Next, as illustrated in Step 9, two method of a method for changing the position of the facial organ of the object and a method for deforming the facial organ are used in order to generate the arbitrary face direction image. First, the method for changing the position of the facial organ of the object will be described using FIG. 10. Changing of the position of the facial organ is performed using the face direction information θ1, θ2, and θ3 calculated using the face direction information calculation unit 108, the correction quantities θ1' and θ2' of the face direction information calculated using the front face position information, and the target face direction information φ1 and φ2 representing the generated face direction. That is, a difference between face direction information θ1+θ1' and θ2+θ2' and target face direction information φ1 and φ2 becomes changed face direction information. Here, face direction difference information is assumed as φ1'(=θ1+θ1'−φ1) and φ2'(=θ2+θ2'−φ2). A movement quantity 901 of the position of the facial organ in the x-axis direction and a movement quantity 902 of the position of the facial organ in the y-axis are calculated and adds the movement quantity in the z-axis using the face direction information θ3 with respect to the z-axis to calculate the position of the facial organ after change of the face direction. The interpupillary distance 903 after the change of face direction is calculated by Equation (11) using face direction difference information φ1' with respect to the x-axis.

$$M3 = \frac{L3}{\cos\phi 1'} \quad (11)$$

Here, the interpupillary distance after change of the face direction is assumed as M3.

A difference between the interpupillary distance 904 and the interpupillary distance 903 after change of the face direction in the input image becomes the movement quantity 901 of the facial organ in the horizontal direction, that is, the x-axis direction. Next, a calculation method of the movement quantity 902 in the y-axis will be described. The length 905 between the eyes and the nose after change of the face direction is calculated by the Equation (12) using face direction difference information φ2' with respect to the y-axis.

$$M4 = \frac{L4}{\cos\phi 2'} \quad (12)$$

Here, the length between the eyes and the nose is assumed as L4 and the length between the eyes and the nose after change of the face direction is assumed as M4 in the input image. A difference between the length 906 between the eyes and the nose and the length 905 between the eyes and the nose after change of the face direction in the input image becomes the movement quantity 902 of the facial organ in the vertical direction, that is, the y-axis direction. Since an inclination θ3 with respect to the z-axis is not taken into account in the calculated movement quantity 901 in the x-axis direction and the calculated movement quantity 902 in the y-axis direction, a target point (Qx, Qy) is calculated using Equations (13) and (14).

$$Q_x = P_x + E1 \times \cos\theta 3 - E2 \times \sin\theta 3 \quad (13)$$

$$Q_y = P_y + E1 \times \sin\theta 3 + E2 \times \cos\theta 3 \quad (14)$$

Here, a movement quantity in the x-axis direction is assumed as E1, a movement quantity in the y-axis direction is assumed as E2, an a feature point in the input image is assumed as a feature point (Px, Py).

Next, description will be made on the method for deforming a shape of the facial organ. In a case where the face direction is inclined with respect to the x-axis, the target direction is set by aligning the length of eyes with a value calculated from the front facial organ information. For example, the target point is set in such a way that the length of the eyes are corrected to make a ratio L1:L2 between the length L1 of the left eye and the length L2 of the right eye equal to the ratio D1:D2 between the length D1 of the left eye and the length D2 of the right eye calculated from the front facial organ information. The ratio D1:D2 between the length of the left eye and the length of the right eye is the length D1 of the left eye and the length D2 of the right eye of the front face arrangement in the past frames. In a case where the past frames are not able to be used, D1:D2=1:1 is used.

In a case where the face direction is inclined with respect to the y-axis, the length of left eye, the length of right eye, the length of nose, and the length of mouth are respectively expanded or reduced and thus, the target point is set to be aligned with the value calculated from the front face arrangement. For example, the target point is set in such a way that the length L1 of left eye is expanded or reduced to make the length L1 of left eye equal to the length D1 of left eye calculated from the front facial organ information. The target point is set in such a way that the length of right eye, the length of nose eye, and the length of mouth also equal to the lengths of the facial organs that respectively correspond to the right eye, nose, and mouth in the front facial organ information calculated similarly. The image deformation is conducted on the input image using one or more of feature points target points corresponding to the feature points among the input image which is set to generate an image in which the facial organs are deformed.

When the target point is set in such a way that a size of eyes or a direction of nose, positions of corners of mouth or the like as well as the lengths of the facial organs are changed, it is possible to emphasize the effect of changing the face direction and thus, it is preferable.

As such, the arbitrary face direction image generation unit 109 conducts image deformation on the input image using one or more of the feature points and the target points corresponding to the feature points in the input image which is set to generate an image in which the position of the facial organ is changed.

Here, the arbitrary face direction image generation unit 109 further deforms the facial organ using the front facial organ information with respect to the image generated as described above.

As such, the image display device 102 of the first embodiment operates.

According to the image display device 102 provided with the image processing device 101 according to the present invention described above, it is possible to appropriately perform image processing by taking into account the face direction of the object and the front face arrangement and display a preferable image.

Second Embodiment

A second embodiment of the present invention will be described. In the present embodiment, furthermore, when a rate of the processing for changing the position of the facial organ and the processing for deforming the facial organ to be conducted on the input image is changed according to the facial organ information of the object, it is possible to obtain the effect of feeling that the face direction is changed even in a case where the face direction is large or a case where all of the facial organs are not detected and thus, it is preferable. For example, in a case where the face direction within the input image calculated from the facial organ information is designated to be 90 degrees with respect to the x-axis, that is, the target face direction is 0 degree in a profile, that is, is designated such that the front face is generated, the processing for changing the position of the facial organ is conducted until the target face direction is set up to a stage of 70 degrees with respect to the x-axis and processing for correcting is performed such that a shape of the face is directed toward the front in the processing for deforming the facial organs to emphasize the effect of changing the face direction.

Next, an example of a case where all of the facial organs such as the eyes, the nose, the mouth are not detected will be described. In a case where the left eye and right eye are detected and the nose and mouth are not detected, an upper left coordinate, an upper right coordinate, a lower left coordinate, a lower right coordinate, a center coordinate of the face region of the object are calculated from a positional relationship between the left eye and the right eye. Five points representing the face region are assumed as feature points and target points are set according to the face direction. When all of the facial organs are not detected, the face direction information of the object within the input image is calculated by only the detected facial organ or calculated by a positional relationship between a camera and the object, and in a case of the moving image, the face direction information is acquired, for example, using the face direction information of the previous frame. In a case where the face direction of the object within the input image is designated to be −10 degrees with respect to the y-axis, that is, the target face direction is 0 degree with respect to the y-axis in the downward direction, that is, is designated such that the front face is generated, it is possible to obtain the effect of feeling that the face direction is changed by setting the upper left coordinate and upper right coordinate of the face region to a direction making the coordinates close to each other, setting the lower left coordinate and lower right coordinate of the face region to a direction making the coordinates far away from each other, and setting the center coordinate in the upward direction of an image.

As such, it is possible to reduce an influence by distortion of the face or an occlusion by adaptively combining two processing for changing the shape and the position of the facial organ even in a case where the direction of face is significantly changed. Furthermore, even when all of the facial organs are not detected, it is possible to obtain the effect of feeling that the face direction is changed.

With processing described above, even when the face direction information is incorrect, the arbitrary face direction image is generated while generating the front face and conducting correction on the facial organ arrangement and as a result, it is possible to generate a preferable image having less sense of incongruity without causing the positions of the eyes and nose of the face to be moved to an unnatural position.

Third Embodiment

Figure 11:
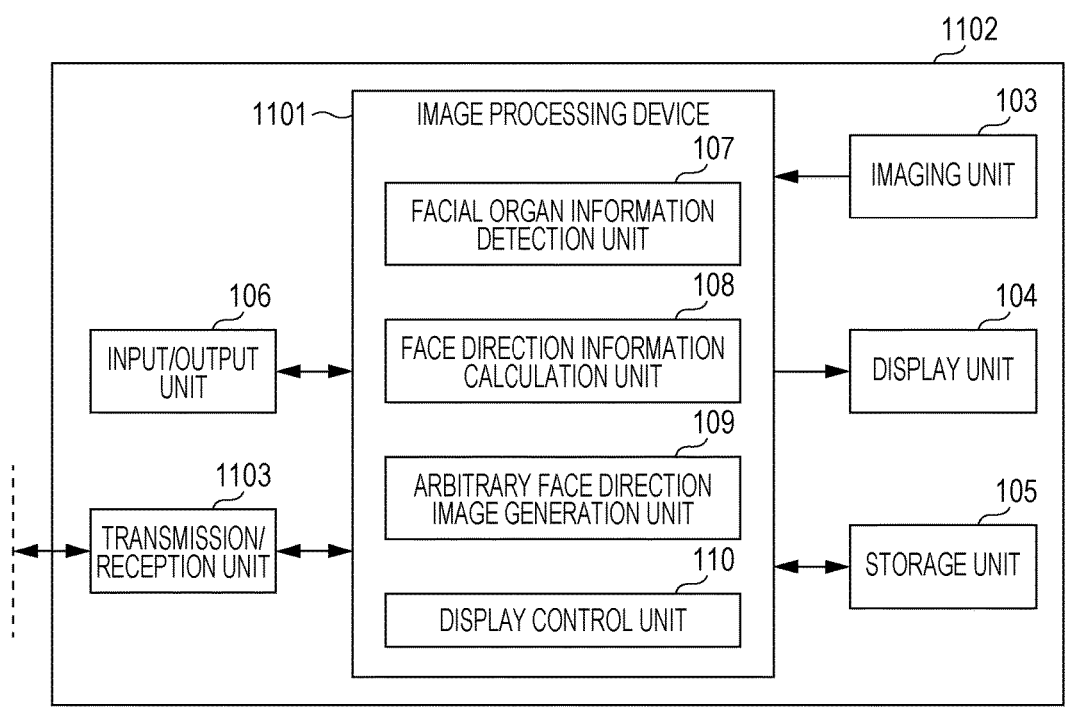
FIG. 11 is a functional block diagram illustrating an example of a configuration of an image display device equipped with an imaging unit and including an image processing device according to a third embodiment of the present invention.

Next, an example of a configuration of an image display device 1102 provided with an image processing device 1101 according to the third embodiment of the present invention will be described using FIG. 11. In FIG. 11, the same constitutional elements as those of FIG. 1 are assigned the same reference numerals and these elements perform the same processing as that of FIG. 1 and thus description thereof will be omitted.

A difference between the present embodiment and the first embodiment is that a transmission/reception unit 1103 is provided in the configuration of the present embodiment. The image display device 1102 is connected to an external network through the transmission/reception unit 1103 and connected to another communication device. The transmission/reception unit 1103 is a communication unit, a cable or the like of a mobile phone, and transmits and receives an image, face position information, face size information, or the like to and from the outside.

In the third embodiment, facial organ information and an image captured by the image display device 1102 are transmitted to another image display device 1102 through the transmission/reception unit 1103 and the facial organ information and the image captured by another image display device 1102 are received. That is, a captured image of a user 2 located at a remote site is displayed on an image display device 1102 of a user 1 and a captured image of the user 1 is displayed on the image display device 1102 of the user 2. This becomes a configuration that implements a video chat or a video conference system. Here, the image display device 1102 capturing the user 1 is distinguished as a first image display device and the image display device 1102 capturing the user 2 is distinguished as a second image display device.

In the following, a flow of the operations described above will be described using a flowchart illustrated in FIG. 12.

First, in Step S21, the image processing device 1101 fetches a first image from the imaging unit 103.

Next, in Step S22, the facial organ information detection unit 107 detects first facial organ information from a first image.

Next, in Step S23, the face direction information calculation unit 108 calculates first face direction information of the object using facial organ information.

Next, in Step S24, the transmission/reception unit 1103 transmits the first image, the first facial organ information, and the first face direction information to a second image display device.

Next, in Step S25, the transmission/reception unit 1103 receives the second image, second facial organ information, and second face direction information.

Next, in Step S26, the image processing device 1101 acquires second target face direction information from the input/output unit 106.

Next, in Step S27, the arbitrary face direction image generation unit 109 determines whether the face of the object is the front face or not based on the second face direction information. If the face of the object is the front face, Steps S31 and S32 are executed. If the face of the object is not the front face, Steps S28 to S32 are executed.

Next, in Step S28, the image processing device 1101 acquires the front facial organ information from the storage unit 105.

Next, in Step S29, the arbitrary face direction image generation unit 109 calculates the facial organ information in the front face from the second facial organ information and the second face direction information.

Next, in Step S30, the arbitrary face direction image generation unit 109 corrects the second face direction information from the acquired front facial organ information and the calculated facial organ information calculated in the front face.

Next, in Step S31, the arbitrary face direction image generation unit 109 generates the arbitrary face direction image from the second facial organ information and the second face direction information.

Next, in Step S32, the arbitrary face direction image generation unit 109 outputs the generated image to the display unit 104.

As such, the image display device of the third embodiment operates.

According to the image display device 1102 provided with the image processing device 1101 of the present embodiment described above, in a case where a user 1 has a conversation with a user 2 in a video chat or a video conference, it is possible to generate an arbitrary face direction image using the facial organ information and face direction information transmitted together with an image to display a preferable image.

The present invention is not intended to be interpreted as being limited to the above-described embodiments and various modifications may be made to the embodiments within a scope of matters set forth in claims and are regarded as being included in a technical scope of the present invention. The constitutional elements of the present invention may be arbitrary selected and the invention provided with the selected constitutional elements is also included in the present invention.

A program that runs on an image processing device according to the present invention may be a program (program that causes the computer to function) that controls a CPU or the like so that functions of the embodiments related to the present invention are implemented. Information handled by the devices may be temporarily accumulated in a Random Access Memory (RAM) while being processed, and then is stored in various Read Only Memories such as an ROM, or a HDD, is read-out, and modified and written by the CPU as necessary.

A program for implementing functions of respective components illustrated in FIGS. 1A and 1B may be recorded in a computer-readable recording medium, the program recorded in the recording medium may be read in a computer system, and processing of each unit may be performed by execution of the CPU or the like. In the meantime, the wording of "computer system" is assumed to include an Operating System (OS), hardware such as peripheral equipment, and the like. The wording of "computer-readable recording medium" means a storage device, for example, a flexible disk, an optical and magnetic disk, an ROM, a portable medium such as a CD-ROM, and a hard disk equipped in a computer system, and the like. In addition, the "computer-readable recording medium" is considered as a medium that dynamically stores a program for a short period of time like a communication line for a case where the program is transmitted through a communication line such as a telephone line or the like, or the network such as the Internet, and a medium that maintains a program for a predetermined period of time like a volatile memory within a computer system which functions as a client or a server in such a case.

A portion or entirety of the image processing device according to the above-described embodiments may be implemented by an LSI which is a typical integrated circuit. Each of functional blocks of the image processing device may be formed in an individual chip, and some or all of the functional blocks may be integrated to form an individual chip. In addition, a method of achieving an integrated circuit is not limited to the LSI, and may be implemented with an exclusive circuit or a general processor. In case a technology of achieving an integrated circuit which substitutes the LSI emerges, it is possible to use an integrated circuit by the technology.

In the above-described embodiments, control lines and information lines considered as being needed for explanation are illustrated and do not necessarily include all the control lines and information lines for a product. All the constitution elements may be connected with each other.

INDUSTRIAL APPLICABILITY

The present invention may be utilized in an image display device.

REFERENCE SIGNS LIST

101 . . . image processing device
102 . . . image display device
103 . . . imaging unit
104 . . . display unit
105 . . . storage unit
106 . . . input/output unit
107 . . . facial organ information detection unit
108 . . . face direction information calculation unit
109 . . . arbitrary face direction image generation unit
109-1 . . . target face direction information acquisition unit
109-2 . . . front face determination unit
109-3 . . . front facial organ information acquisition unit
109-4 . . . corrected facial organ information calculation unit
109-5 . . . face direction information correction unit
109-6 . . . arbitrary face direction image generation processing unit
110 . . . display control unit
1103 . . . transmission/reception unit
(Attachment)

The present invention includes the following disclosure.

(1)

An image processing device which includes a facial organ information detection unit that detects facial organ information which is a position of a facial organ of an object from an input image, a face direction information calculation unit that calculates face direction information of the object from the facial organ information, and an arbitrary face direction image generation unit that generates an image obtained by changing the face direction of the object from the facial organ information and the face direction information, and when it is determined by the face direction information that the face is inclined, the arbitrary face direction image generation unit generates an arbitrary face direction image after conducting a correction to the face direction information based on front facial organ information which is a facial organ arrangement in the front face of the object.

When face direction information is incorrect, an arbitrary face direction image is generated while correcting a deviation of the face direction information using the position of the facial organ such as the eyes and nose in the front face of the object which is set in advance and the position of the facial organ in the front face calculated from the face direction information.

(2)

The image processing device described in (1), wherein the arbitrary face direction image generation unit generates an image obtained by changing the face direction of the object from the facial organ information and the face direction information by processing for changing the position of the facial organ and processing for deforming the facial organ.

(3)

The image processing device described in (2), wherein the arbitrary face direction image generation unit adjusts a ratio of the processing for changing the position of the facial organ and the processing for deforming the facial organ according to the facial organ information.

It is possible to obtain more suitable image by performing the adjustment.

(4)

The image processing device according to any one of (1) to (3), wherein the arbitrary face direction image generation unit corrects the face direction information using at least one of processing for assuming an arrangement of a face of an object determined as a front face in previous frames front facial organ information and processing for assuming a position of the facial organ calculated based on a golden ratio of a face as front facial organ information.

It is possible to obtain a suitable image by simple processing using the golden ratio.

(5)

An image display device that includes an imaging unit capturing an image of an object and the image processing device described in (1) which processes the image of the object captured by the imaging unit.

(6)

The image processing device according to any one of (1) to (4), wherein the face direction information calculation unit calculates an inclination of the face with respect to the x-axis which is a horizontal axis passing from the left end to the right end in the face of the object from a ratio between lengths of organs in the horizontal direction.

The lengths of the left eye and right eye are respectively assumed as lengths between a position of the inner eye corner and a position of the outer eye corner.

(7)

The image processing device described in (6), wherein the face direction information calculation unit calculates the inclination of the face with respect to the y-axis which is an the axis of the horizontal direction from the lower end toward the upper end of the face of the object from a ratio of a length between the eyes and nose and an interpupillary distance of the object and an inclination $\theta 1$ of the face with respect to the x-axis.

(8)

The image processing device described in (6) or (7), wherein the face direction information calculation unit calculates an inclination of the face of the object with respect to the z-axis which is an axis passing from the front side to the back side in the face of the object from the interpupillary distance and a deviation between the left eye and right eye in the vertical direction.

(9)

The image processing device described in (1) or (2), wherein the arbitrary face direction image generation unit sets a feature point which is set in the image and a target point which is a point of a movement destination of the feature point and performs coordinate conversion so as to make the feature point and the target point close to each other to change the position of the facial organ within the image and deform a shape of the facial organ.

(10)

The image processing device described in (1) or (2), wherein the arbitrary face direction image generation unit conducts image deformation on the input image using one or more feature points which are set within the input image target point corresponding to the feature points to generate an image in which the position of the facial organ is changed.

(11)

An image processing method which includes a facial organ information detection step that detects facial organ information which is a position of a facial organ of an object from an input image, a face direction information calculation unit that calculates face direction information of the object from the facial organ information, and an arbitrary face direction image generation step that generates an image obtained by changing the face direction of the object from the front facial organ information and the face direction information, and wherein the arbitrary face direction image generation step generates an arbitrary face direction image after conducting a correction on the face direction information based on front facial organ information which is a facial organ arrangement in the front face of the object.

(12)

A program causing a computer to execute the image processing method described in (11).

All publications, patents and applications for those patents cited in the present are considered to be incorporated into the present application in their entirety as references.

The invention claimed is:

1. An image processing device comprising:
  facial organ information detection circuitry that detects, from an input image, facial organ information which is indicative of a position of a facial organ of an object in the input image,
  face direction information calculation circuitry that calculates face direction information based on the facial organ information which is detected by the facial organ information detection circuitry, and
  arbitrary face direction image generation circuitry that generates an image obtained by changing a face direction of the object into an arbitrary face direction which is a target face direction, wherein the image is obtained based on the facial organ information, front facial organ information which is indicative of a facial organ arrangement in a front face, and the face direction information;

frame images of a moving image are each inputted to the image processing device; and after one of the frame images in which it is determined that the face direction of the object indicated by the face direction information is a front direction, the arbitrary face direction image generation circuitry uses, as the front facial organ information, the front facial organ information which is indicative of a facial organ arrangement of the arrangement in the frame image.

2. The image processing device according to claim 1, wherein the arbitrary face direction image generation circuitry generates an image obtained by changing the face direction of the object by processing for changing the position of the facial organ of the object and processing for deforming the facial organ.

3. The image processing device according to claim 2, wherein the arbitrary face direction image generation circuitry controls, in accordance with an angle by which the face direction of the object is to be changed, a degree by which the position of the facial organ is changed in the processing to change the position of the facial organ to be conducted on the input image.

4. An image display device comprising:
an image sensor that captures a moving image of an object; and
the image processing device according to claim 1 that processes the moving image of the object captured by the image sensor.

5. The image processing device according to claim 1, wherein the image obtained by changing the face direction of the object into the arbitrary face direction is a moving image of the front face of the object.

6. The image processing device according to claim 1, further comprising:
a transceiver that transmits and receives the image and the facial organ information; and
a display which outputs the image generated by the arbitrary face direction image generation circuitry obtained by changing the face direction of the object.

7. A video conference system comprising the image processing device according to claim 6.

* * * * *